March 21, 1950 — E. W. JONES — 2,501,524
SANDING ATTACHMENT FOR ELECTRIC MOTORS
Filed Dec. 8, 1948
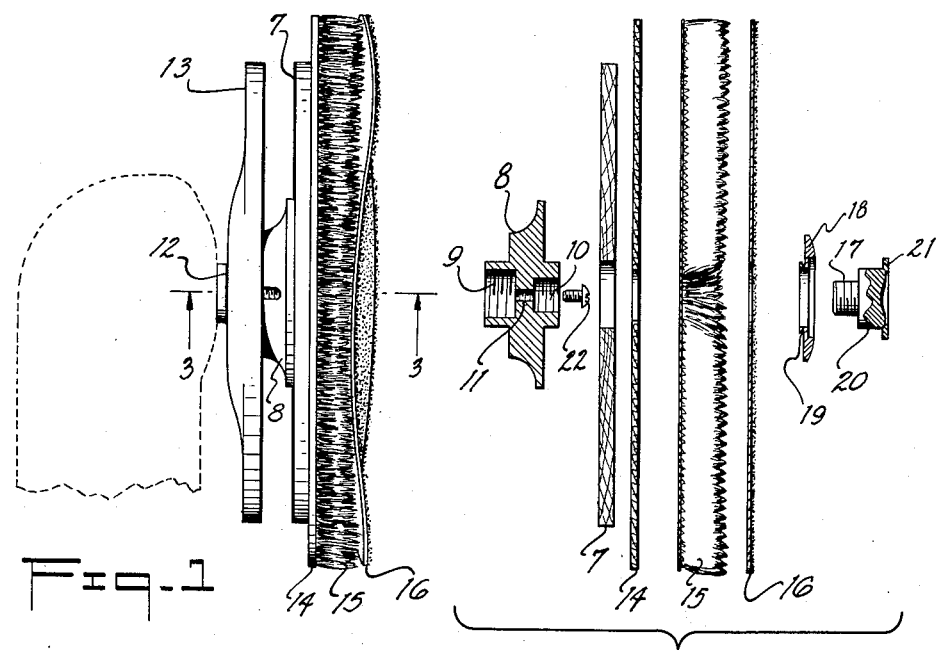
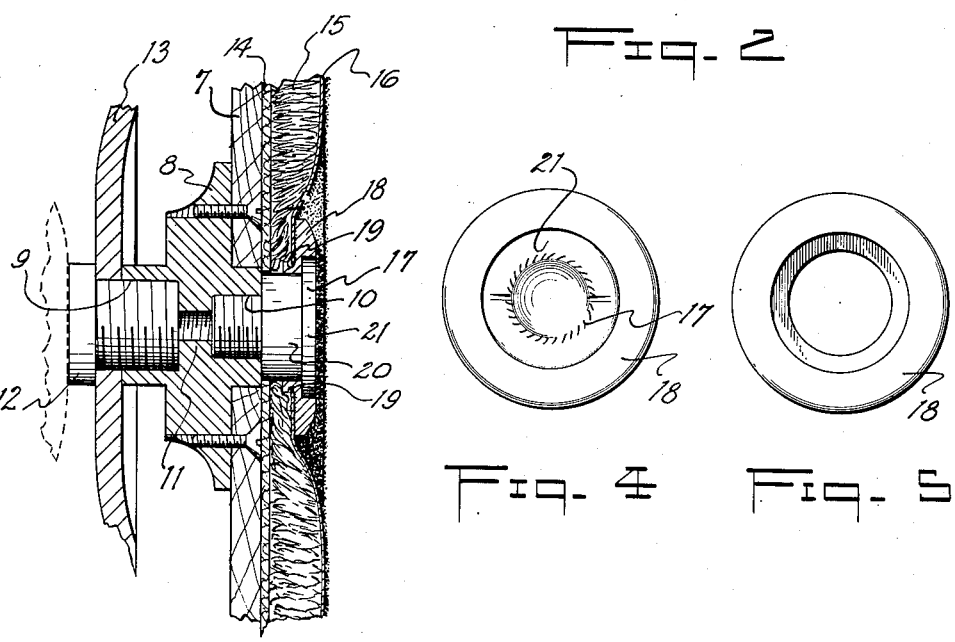
INVENTOR.
ELMER W. JONES
BY
ATTORNEY Patented Mar. 21, 1950

2,501,524

UNITED STATES PATENT OFFICE 2,501,524

SANDING ATTACHMENT FOR ELECTRIC MOTORS

Elmer W. Jones, Paramus, N. J., assignor to Robert D. Watson, Westwood, Mass., and James Shapiro, Brookline, Mass.

Application December 8, 1948, Serial No. 64,098

6 Claims. (Cl. 51—197)

My invention relates to attachments or adapters for motor driven polishing or sanding tools and has as its object to provide a simple, readily applied clamping means for the polishing disc of sand paper or the like by which the action of the disc may be varied by the mere increase or decrease of the pressure applied and particularly a supporting means which can be applied directly to the motor driven shaft without disturbing the usual backing plate.

Fig. 1 is a diametrical section of a polishing member embodying my invention as applied to the output shaft of a driving motor.

Fig. 2 is an exploded edge and sectional view of the polishing members.

Fig. 3 is a partial section and edge view showing the clamping member tightened up.

Fig. 4 is a face view of the clamping member.

Fig. 5 is a face view of the slip ring.

A rigid backing plate 7 has a hub 8 with a screw-threaded socket 9 at the rear and a screw-threaded socket 10 at the front with a web 11 between the sockets. The socket 9 fits the motor shaft 12 or an adaptor so that the backing plate may be screwed down on to the end of the motor shaft on top of the usual disc or backing plate 13.

A thick resilient annular pad consisting of a canvas foundation 14 with woolen pile threads 15 is secured to the backing plate in a suitable manner, for instance by cement. The sand paper or emery disc 16 is clamped against the pad by a screw stud 17 and slip ring 18. The stud is threaded to screw into the socket 10 and the slip ring has a groove 19 to receive the disc 16 and is rotatably mounted on the hub 20 of the stud beneath the flange 21.

When the pad is new a stop member 22 may be screwed into the web 11 at the bottom of the socket 10 to limit the seating of the screw stud. This may be removed or replaced with a thinner stop when the pad becomes worn or compressed.

The outer face of the stud 17 may be provided with a knurled or roughened surface or a slot to facilitate turning it in or out of the socket.

When the tool is in use, the disc 16 rotates with the pad but it may be controlled by pressing the disc more or less against the work piece whereupon the ring 18 will slip on the hub of the stud and with the disc will lag behind the motor shaft thus regulating the polishing action.

The stud 17 is preferably formed of hard metal such as steel and the slip ring 18 which is rotatable on it is frequently formed of a material such as Phosphor bronze having a better coefficient of friction which is suitable for use with a harder metal.

The use of this slip ring clutch device prevents destruction of the sanding disc in case too much pressure is applied.

I claim:

1. A sanding attachment for a motor comprising a back plate having an interiorly screw-threaded socket through its rear face adapted to fit on the end of a motor shaft or an adaptor and having a second screw-threaded socket surrounded by a soft pad through the front face and a slip clutch for holding a polishing disc against said pad, said clutch comprising a stud screwed into the second socket and having a peripheral flange and a friction ring mounted on said stud beneath said flange for engaging the polishing disc and frictionally pressing it against the pad.

2. A sanding attachment for a motor comprising a back plate having an interiorly screw-threaded socket through its rear face adapted to fit on the end of a motor shaft and having a second screw-threaded socket surrounded by a soft pad through the front face and a slip clutch for holding a polishing disc against said pad, said clutch comprising a stud screwed into the second socket and having a peripheral flange and a friction ring mounted on said stud beneath said flange for engaging the polishing disc and frictionally pressing it against the pad and a stop removably secured in the bottom of the front socket to serve as an abutment for the clutch stud.

3. A sanding attachment for a motor comprising a back plate having an interiorly screw-threaded socket through its rear face adapted to fit on the end of a motor shaft and having a second screw-threaded socket surrounded by a soft pad through the opposite face and a slip clutch for holding a polishing disc against said pad, said clutch comprising a stud screwed into the second socket, a friction ring mounted on said stud for engaging the polishing disc and frictionally pressing it against the pad, said ring having a groove for holding the polishing disc.

4. A sanding attachment for a motor comprising a back plate having an interiorly screw-threaded socket through its rear face adapted to fit on the end of a motor shaft and having a second screw-threaded socket surrounded by a soft pad through the opposite face and a slip clutch for holding a polishing disc against said pad, said clutch comprising a stud screwed into the second socket, a friction ring mounted on said stud for engaging the polishing disc and frictionally pressing it against the pad and a stop removably secured in the bottom of the socket for the clutch stud.

5. A sanding attachment for a motor comprising a back plate having an interiorly screw-threaded socket through its rear face adapted to fit on the end of a motor shaft and having a second screw-threaded socket surrounded by a soft pad through the front face and a slip clutch for holding a polishing disc against said pad, said clutch comprising a stud screwed into the second socket and having a peripheral flange, a friction ring mounted on said stud beneath said flange for engaging the polishing disc and frictionally pressing it against the pad, said ring having a groove for retaining said disc and a stop removably secured in the bottom of the front socket.

6. An abrasive tool comprising, a coupling member for attachment to a drive spindle, said coupling member having a threaded tubular portion and a flange extending laterally of the tubular portion, a backing plate positioned against the flange and attached to the coupling member, a pile fabric pad positioned upon said backing plate, said pad having a hole through the centre thereof concentric with said coupling member, an abrasive disk having a hole through the centre thereof positioned with the non-abrasive side against the pad, a friction member having a bore through the centre thereof and an annular groove surrounding said bore, a clamping member having an annular flange at an end thereof passing through the bore in the friction member and threadedly secured to the coupling member said annular flange engaging the friction member in the annular groove and a screw engaging the clamping member for limiting the depth to which the clamping member may enter the coupling member whereby the abrasive disk will be held upon the backing pad with a predetermined frictional contact.

ELMER W. JONES.

No references cited.